United States Patent [19]

Duncan

[11] 3,977,092
[45] Aug. 31, 1976

[54] TEACHING MACHINE CARD

[76] Inventor: Ernest R. Duncan, Harmony Hill, Mount Harmony Road, Bernardsville, N.J. 07924

[22] Filed: Dec. 16, 1975

[21] Appl. No.: 641,280

Related U.S. Application Data

[62] Division of Ser. No. 382,273, July 24, 1973, Pat. No. 3,925,909.

[52] U.S. Cl. .......................... 35/48 A; 235/61.6 E; 235/61.12 R
[51] Int. Cl.² .......................................... G09B 7/00
[58] Field of Search ............. 35/8 R, 9 R, 9 A, 9 D, 35/30, 31, 6, 48 R, 48 A, 48 B; 235/61.6 E, 61.12 R, 61.12 N

[56] References Cited
UNITED STATES PATENTS

| | | | |
|---|---|---|---|
| 2,789,370 | 4/1957 | Studebaker et al. | 35/9 R |
| 2,798,669 | 7/1957 | Hale | 35/48 A X |
| 3,151,403 | 10/1964 | Sinex | 35/9 R |
| 3,373,265 | 3/1968 | Smitzer | 235/61.1 Z R |
| 3,374,559 | 3/1968 | Smith, Jr. | 35/31 G |
| 3,541,699 | 11/1970 | Baker, Jr. | 35/9 A |
| 3,609,880 | 10/1971 | Arbon | 35/9 A |
| 3,729,836 | 5/1973 | Mayeda | 35/6 |
| 3,912,909 | 10/1975 | Harrison | 235/61.12 N X |

Primary Examiner—Richard C. Pinkham
Assistant Examiner—Vance Y. Hum
Attorney, Agent, or Firm—Edward R. Weingram

[57] ABSTRACT

A teaching machine utilizes a card having recorded on it visually readable statements of problems and corresponding machine readable answers. The teaching machine displays the answers to the problem on the card positioned for solution only if the student first enters the correct answer on the keyboard. The teaching machine also includes an interrogating device for counting the number of attempted solutions and the number of correct answers by the student, along with a device to display the contents of the counting device on the display.

3 Claims, 4 Drawing Figures

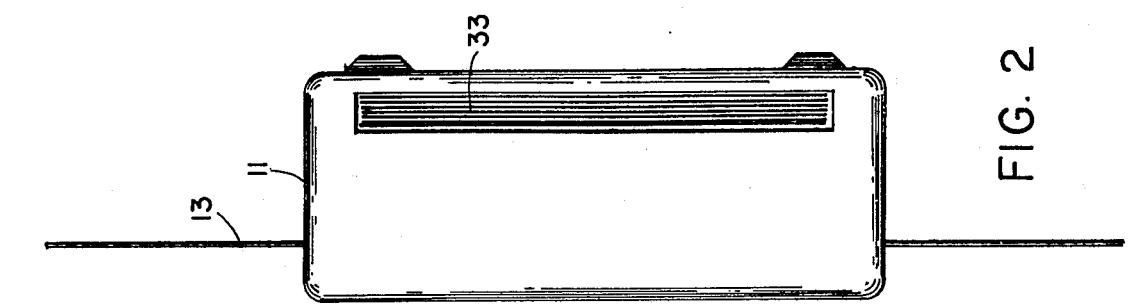
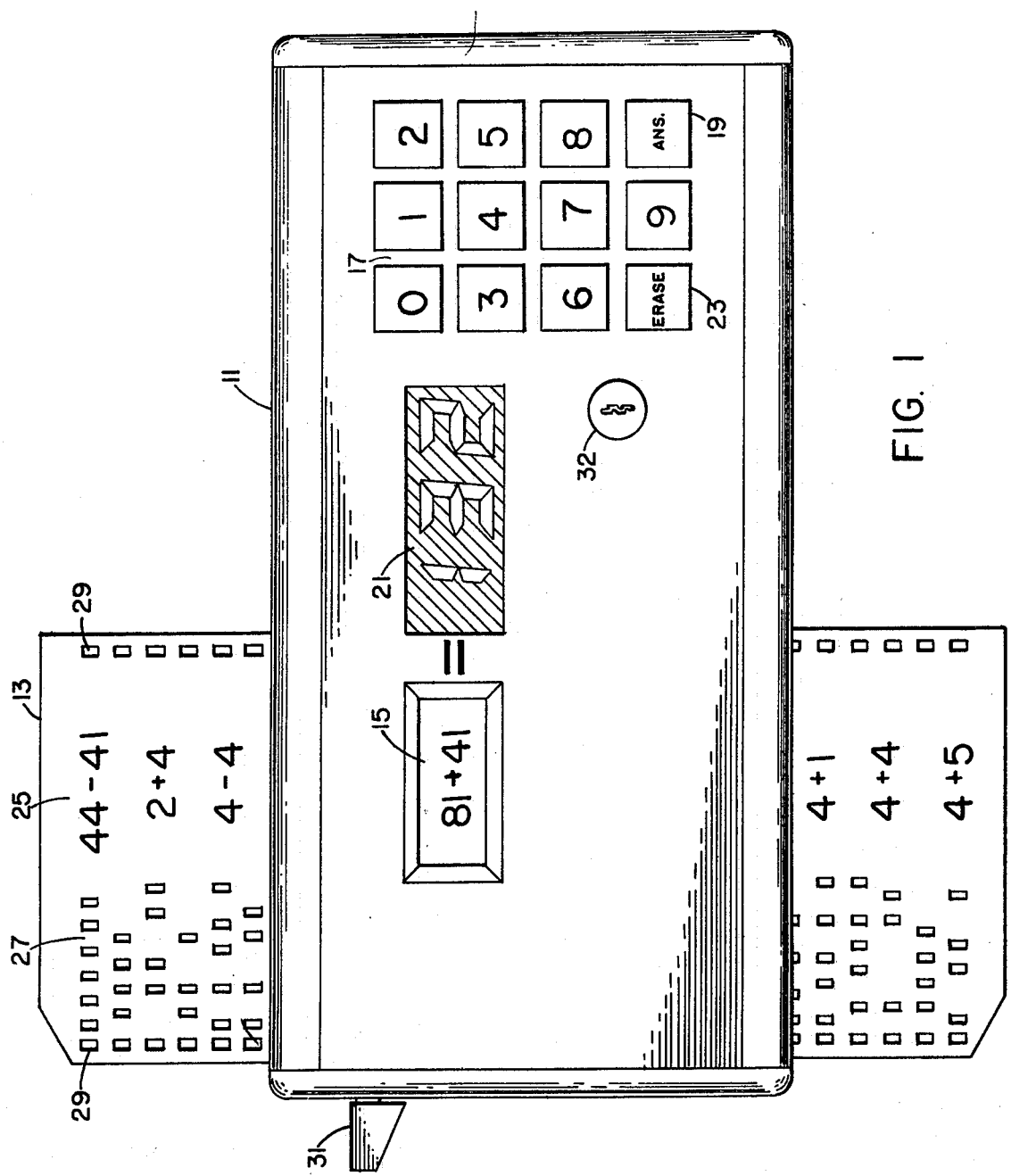

TEACHING MACHINE CARD

This is a division of application Ser. No. 382,273 filed July 24, 1973, now U.S. Pat. No. 3,925,909.

BACKGROUND OF THE INVENTION

1. Field of the Invention

This invention relates generally to teaching machines and, more particularly, to teaching machines of the type in which the answer to a problem on an inserted record member appears on a display only if the student first enters the correct answer into the machine.

2. Description of the Prior Art

A number of teaching machines have been disclosed in which the student enters an answer to a displayed problem and the machine confirms the answer if it is correct. These machines have generally not achieved wide acceptance as standard teaching aids for the everyday teaching of subjects to classes of students, since all of them have severe disadvantages which prevent them from being practicable.

One such teaching machine, which is described in U.S. Pat. No. 3,172,216, makes use of a program disc whose surface is divided into a number of concentric zones. The statement of a mathematical problem is recorded adjacent to the problem in the next zone toward the center. The next inner zone of the disc is an answer area in which are punched coded answer holes. When a student enters a correct or an incorrect answer or takes too much time in deciding on an answer, a corresponding stylus is activated and produces a mark on a central zone of the disc.

The statement of a problem on the disc is visible to the student through a viewing port in the machine and a keyboard is provided for allowing the student to enter an answer. If the entered answer is correct, a series of indicator lights are illuminated. Once the student has entered an answer, he may expose the correct answer recorded in the disc by operating an answer check key.

This teaching machine has several disadvantages. It is complex and bulky and much too expensive to permit a school to have one available for each member of a class. Furthermore, it is not practical for use in testing a student's mathematical knowledge, since in order for the instructor to determine the number of correct and incorrect answers, he must count the number of marks on the central protion of the disc. If it is necessary to do this for any appreciable number of students the task becomes too burdensome to be carried out on a regular basis. Furthermore, the use of styli in the machine present substantial reliability and maintenance problems which would prevent this machine from being practical for general classroom use.

Another teaching machine, described in U.S. Pat. No. 3,584,398, randomly generates problems electroncially to be solved by the student. This machine is also clearly not suitable for general class use since there is no way of controlling the difficulty level of the problems being presented to the student. Thus in any given period of time the problems presented by the machine to one student may be more or less difficult than those presented to another student, thereby preventing any meaningful determination of relative progress.

U.S. Pat. Nos. 2,564,089; 3,212,199; 3,521,381; and 3,553,853, all disclose teaching machines which are much too complex, bulky and expensive for general classroom use.

U.S. Pat. Nos. 3,070,904; 3,508,349 and 3,696,526, on the other hand, disclose educational devices of such an elementary nature little more than games.

SUMMARY OF THE INVENTION

The applicant provides an improved teaching machine which utilizes a record member having machine readable answers for corresponding visually readable statements of problems to actuate a display on the machine of the correct answer only if the student viewing a specific problem statement on the record member at an appropriate viewing position in the machine first enters the correct answer on a keyboard. The teaching machine also provides interrogating means for counting and displaying on the machine display the number of attempted solutions and correct answers by the student.

In view of the above, it is an object of the present invention to provide a teaching machine suitable for general classroom use.

Another object of the present invention is to provide a teaching machine which is small enough and light enough to be hand held or easily handled by very young students in the early grades.

It is yet another object of the present invention to provide a teaching machine having simplified operation to enable effective use of the device by young children.

It is a further object of the present invention to provide a teaching machine which enables the student to work independently without supervision of the teacher, but which allows the teacher to carefully check the progress and performance of the student.

Yet another object of the invention is to provide teaching machines of the type in which an answer to a problem is displayed only if the student first enters the correct answer on the keyboard.

Another object of the present invention is to provide a relatively inexpensive teaching machine, which is capable of performing meaningful teaching functions.

It is still another object of the present invention to provide a teaching machine which is useful both for teaching and for testing.

Yet another object of the present invention is to provide a teaching machine in which the problems to be solved are contained on a reusable record member.

It is another object of the present invention to provide a teaching machine which stores information of the number of correct and incorrect answers made by the student.

Additionally, it is a further object of the present invention to provide a teaching machine which stores information for determining the number of correct and incorrect answers made by the student in which this information is accessible only to the teacher and erasable only by the teacher.

Still another object of the present invention is to provide a teaching machine which is relatively durable and tamperproof.

It is a further object of the present invention to provide a teaching machine which uses a record member which cannot be easily decoded or tampered with by the student to obtain correct answers.

Still another object of the present invention is to provide a teaching machine which can display the total problem to be solved and the total problem sentence when correctly answered.

It is yet another object of the present invention to provide a teaching machine which uses a record member in an efficient manner to provide ease of use, ease of storage, and ease of control of the problems to be posed to the student.

Other objects and advantages will be apparent from the following description of an embodiment of the invention, and the novel features will be particularly pointed out hereinafter in connection with the appended claims.

BRIEF DESCRIPTION OF THE DRAWINGS

FIG. 1 is a front view of a preferred embodiment of a teaching machine in accordance with the invention.

FIG. 2 is an end view of the teaching machine of FIG. 1.

DESCRIPTION OF THE PREFERRED EMBODIMENT

Figure 4:
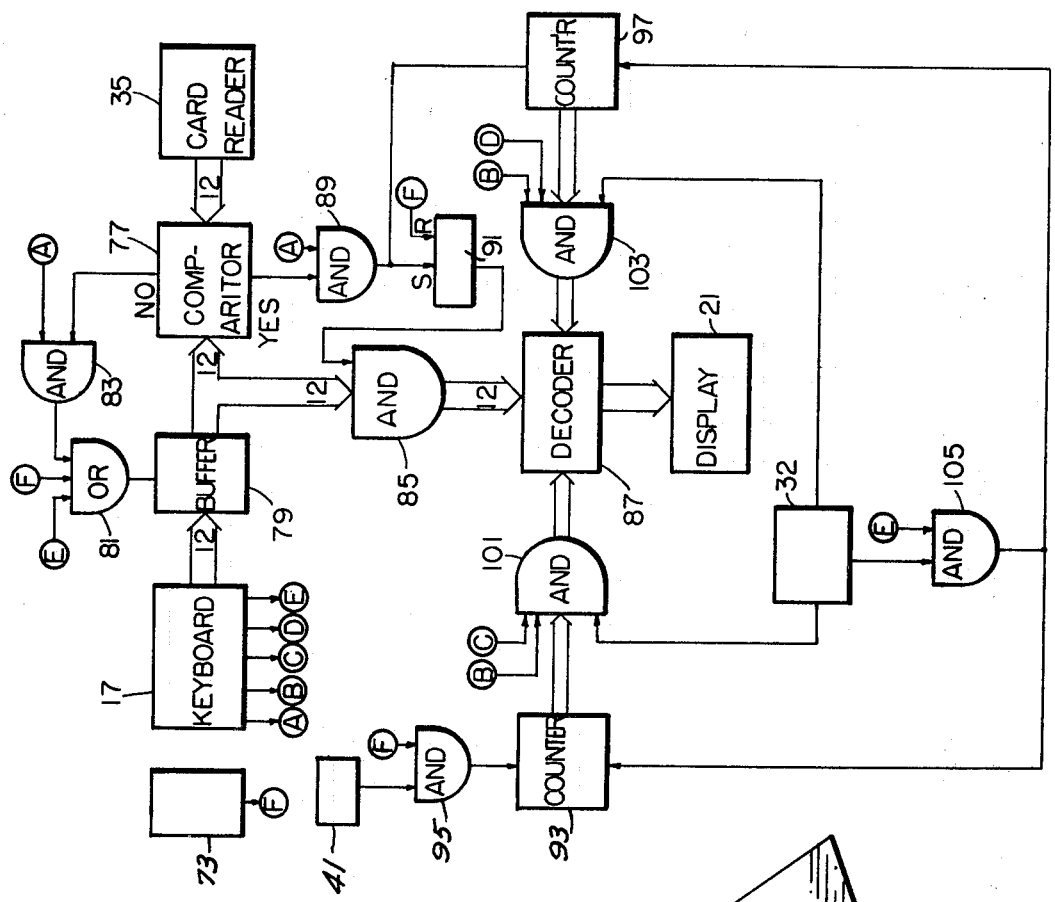
FIG. 4 is a schematic diagram of the electronic portion of the teaching machine of FIG. 1.

The invention can best be understood by referring to the following detailed description of the illustrated embodiment.

Referring now to FIG. 1 of the drawings, the teaching machine according to the illustrated embodiment of the invention includes a casing 11 which may for instance be formed from plastic or metal. A reusable record member which in this case may consist of a punched card 13 is inserted into a record receiving slot in the casing 11 so that the statement of a problem to be solved appears in the aperture 15 in the casing 11. A keyboard 17 is provided to allow the student to enter the answer to the problem on the card which is visible through the aperture 15.

After the student enters what he feels to be the correct answer in the numerical keys of the keyboard 17, he depresses the answer key. If the answer which he enters is correct, the answer is displayed on the display 21. If the answer which he entered is incorrect, the display 21 remains blank. If while entering the answer on the keyboard 17, the student decides that he has made a mistake, he depresses the erase key 23 which allows him to start over in entering another answer. A key slot 32 is provided for use by the teacher in determining the number of correct and incorrect answers entered by the student as will be discussed in greater detail below.

The card 13 includes a column 25 of visually readable statements of problems and a column 27 of machine readable statements of the answer to the problem in the corresponding place in the column 25. In the illustrated embodiment of the invention, the machine readable statement of the answer is made up of a row of holes punched in the card. Columns 29 of indexing holes are disposed proximate either edge of the card to allow the student to advance the card to the next problem after he is finished with the problem he is working on. The advancing of the card is accomplished by depressing the indexing lever 31.

The column 25 of optically readable statements of problems is positioned on the card 13 so that the statements of the problems line up with the aperture 15 for viewing when the card is inserted into the card receiving aperture in the case 11. The column 27 of machine readable statements of the answer to the problem is disposed on the card to line up a card reading device disposed within the teaching machine. In order to get full use of the card 13 another column of problems may be recorded on the opposite of the card 13 so that after completing one side of the card 13 the student may flip the card 13 over lengthwise and re-enter the card 13 in the card receiving slot. In this connection it can be observed that there are two machine readable rows of information in answer column 27 for each problem in column 25. In the illustrated embodiment of the invention only one of these rows contains the answer to the corresponding problem. The other of these rows contains the answer to a corresponding problem on the reverse side of the card 13. The viewing aperture 15 is aligned with the display 21 and an equal sign is placed therebetween to strengthen the visual reinforcement which the student receives when he enters a correct answer.

As can be seen in FIG. 2 of the drawings a card storage slot 33 is provided in one end of the teaching machine for storing excess cards.

In the illustrated embodiment of the invention the answers in column 27 are recorded in binary coded decimal form and thereby require four hole places for the four bits of each digit. Thus for three digit answer capability a total of twelve hole places are required for each row. In order to prevent the student from reading the answer optically extra hole tracks may be provided and the tracks may be scrambled so that tracks relating to bits of different answer digits may be interlaced in a random fashion. Additional tracks may also be provided for problems in which a timed response is required.

Figure 3:
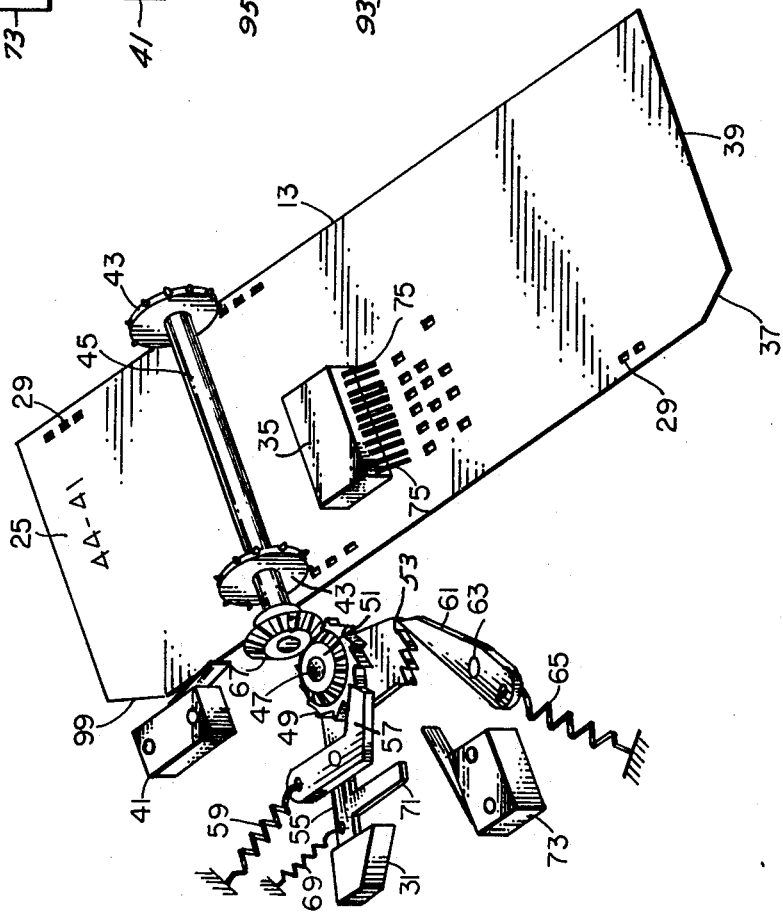
FIG. 3 is a simplified mechanical schematic of the card advance mechanism of the teaching machine of FIG. 1.

Referring now to FIG. 3 of the drawings, there is illustrated a simplified mechanical schematic of a card advance mechanism and the answer reading brush assembly 35. When the card 13 is inserted into the card receiving slot in the teaching machine the chamfered portion 37 of the leading edge 39 of the card 13 depresses the actuating contact of the microswitch 41. The card 13 is stopped when the leading edge 39 strikes the card advance wheels 43 which are carried on shaft 45 and aligned with the columns of indexing holes 29 along either edge of the card 13.

The card advance lever 31 is pivotally mounted on a shaft 47. Also pivotally mounted on the shaft 47 is an indexing ratchet 49. A bevel gear 51 is affixed to and rotates with the ratchet 49. An anti-backup ratchet 53 is affixed to and rotates with the shaft 55 of lever 31. An indexing pawl 57 is pivotally mounted on the shaft 55 of lever 31 and biased into contact with the indexing ratchet 49 by the spring 59. A pawl 61 is pivotally mounted on shaft 63 and biased into engagement with the anti-backup ratchet 53 by spring 65. The bevel gear 51 engages the bevel gear 67 which is affixed to and rotates with the shaft 45. Lever 31 is biased toward its uppermost position by the spring 69.

In order to advance the card so that the first problem is in registry with the aperture 15 (FIG. 1) the student depresses the card indexing lever 31 thereby rotating it around the shaft 47.

Pawl 57 rotates the ratchet 49 which rotation is coupled through the bevel gears 47 and 67 to the shaft 45 in order to index the card 13 by the distance between adjacent problems in the column 25 thereby bringing the first or next problem into registry with the viewing aperture 15. If the student depresses the lever 31 only a portion of its stroke the engagement of pawl 61 with the anti-backup ratchet 53 prevents the lever 31 from returning upwardly until the lever 31 is depressed the rest of the way. When the lever 31 is depressed completely, the ratchet 53 moves beyond the pawl 61 so that, on the return stroke of the lever 31 and the ratchet 53, the ratchet cams the back side of the pawl 61 out of the way.

The provision of the anti-backup ratchet 53 and the pawl 61 prevents the card 13 from being partially indexed by the student causing misalignment of the problems in column 25 with the viewing aperture 15.

The extension 71 of the shaft 55 actuates the card advance microswitch 73 at the lower extreme of the travel of the lever 31 for purposes to be discussed below.

The machine readable answer in column 27 corresponding to the problem in column 25 visible through the aperture 15 is read by means of reading head 35. In the illustrated embodiment of the invention reading head 35 may comprise a line of twelve brushes 75 which are aligned with the twelve tracks of hole places in column 27 of binary coded decimal punched holes. When a brush 75 is in registry with a hole in column 27 it makes contact with a ground plate positioned opposite the brushes on the other side of the card. When a brush 75 is in contact with a portion of the card 13 in which no hole is punched, the brush 75 is insulated by the card 13 from the ground plate. Thus the reading head 35 can read a hole as a binary 1 and the absence of a hole as a binary 0 or vice-versa.

It should be apparent that other types of brush configurations and other types of reading mechanisms, for instance, star wheels, may equally well be used to read the coded rows of punched holes in column 27 of the card 13.

Referring now to FIG. 4 of the drawing there is illustrated a schematic diagram of the electronic portion of the teaching machine of the illustrated embodiment of the invention. When a card 13 is positioned within the teaching machine with a problem in registry with the aperture 15, the output of the card reader 35 corresponds to the binary coded decimal answer to the problem read by the brushes 75. This output of the card reader 35 is connected to the comparator 77 which compares it to the contents of the twelve bit keyboard buffer 79. The answer entered by the student into the keyboard 17 is loaded into the buffer 79 in binary coded decimal form. The comparator 77 may, for instance, consist of an array of 12 exclusive OR gates which receive as inputs the corresponding output bits of the buffer 79 and card reader 35 and whose outputs are all connected to a single OR gate. The presence of an output from the single OR gate indicates a non-coincidence between the outputs of the buffer 79 and the card reader 35 and therefore an incorrect answer entered in the keyboard 19 by the student. The output of the single OR gate could be used directly as the "NO" output of the comparator 77 and the inversion of the output of the single OR gate can be used as the "YES" output of the comparator 77.

If the student feels he has made a mistake in entering an answer into the keyboard 17 he depresses the erase key 23 (FIG. 1) which actuates the output E of the keyboard 17. The energization of the E output of the keyboard 17 acts to clear the buffer 79 through the OR gate 81, thereby allowing the student to enter a new answer into the keyboard 17 and the buffer 79.

The depression of the answer key 19 (FIG. 1) acts to actuate the A output of the keyboard 17. If the student enters an incorrect answer into the keyboard 17 the output of the buffer 79 does not agree with the output of the card reader 35 so that the NO output of the comparator 77 is activated. If the student then depresses the answer key 19 the A output of the keyboard is activated thereby gating the NO output of the buffer 79. The display 21 remains blank since the output of the buffer 79 connected to the array of twelve AND gates collectively illustrated by AND gate 85 is not gated through to the decoder 87 since the YES output of the comparator 77 is not activated.

If the student enters the correct answer in the keyboard 17 the output of the buffer 79 and the card reader 35 coincide so that the YES output of the comparator 77 is activated. The generation of the A output of the keyboard 17 upon the depression of the answer key 19 by the student acts to gate the YES output of the comparator through the AND gate 89 thereby setting flip flop 91. The setting of flip flop 91 acts to gate the answer in the buffer 79 through the array of AND gates 85 to the decoder 87. The decoder 87 decodes the binary coded decimal output of the buffer 79 in a well known manner into driving signals for the proper electrode segments of the liquid crystal display 21 thereby causing the correct answer to appear on the display 21 and visually reinforcing the student's learning experience.

When the student advances the card 13 to the next problem by depressing the card advance lever 31 (FIG. 3) he activates the card advance microswitch 73 thereby generating the signal indicated as F in FIG. 4 of the drawings. The generation of the F signal acts to reset the flip flop 91 thereby blocking AND gate 85 and clears buffer 79 through OR gate 81 thereby erasing the display and preparing the buffer 79 for the entry of the answer to the new problem.

The card advance signal F is also connected to the answer counter 93 through the AND gate 95 since the card sensing microswitch 41 is switched on by the presence of the card 13. Counter 93 therefore counts the number of problems which have been presented to the student whether or not he attempts to answer them.

The output of AND gate 89 is also connected to counter 97 which thereby counts the number of correct answers made by the student.

The card presence detecting microswitch 41 (FIG. 3) is positioned with respect to the aperture 15 is such a way that, as the student depresses the lever 31 after the last problem on the card 13, the actuating member 40 of the microswitch 41 is released by the chamfered portion 99 of the trailing edge of the card 13 before the extensions 71 actuates the card advance microswitch 73. Thus referring to FIG. 4 of the drawings, the microswitch 41 is deactivated before the signal F is generated by the card advance microswitch 43 thereby blocking AND gate 95. Thus the advance of the card after the last problem is not counted by counter 93.

When the teacher wishes to interrogate the teaching machine to determine the number of problems attempted by the student and the number of correct answers achieved, he inserts a key into the key slot 32 and depresses predetermined keys of the keyboard 17 to cause the number of attempted problems or correct answers to appear on the display 21. To determine the number of attempted problems the teacher, with the key inserted in the key slot 32, simultaneously depresses the 8 and 2 keys on the keyboard 17 thereby activating outputs B and C of the keyboard. This causes the AND gate 101 to gate the output of the counter 93 to the decoder 87 which in turn decodes the contents of the counter 93 and energizes the correct electrode segments of the liquid crystal display 21 for displaying the numbers stored in the counter 93.

To determine the number of correct answers, the teacher, while the key is inserted, simultaneously depresses the 8 and the 3 keys on the keyboard 17, thereby actuating the B and D outputs of the keyboard 17. This in turn causes the AND gate 103 to gate the contents of the counter 97 to the decoder 87 for display on the liquid crystal display 21. In order to clear the counters 93 and 97 the teacher, with the key inserted in the key slot 32, depresses the erase key 23 thereby causing the keyboard 17 to generate the E signal. The generation of E signal with the key in the key slot 32 clears the counters 93 and 97 through AND gate 105.

It should be apparent from the foregoing description of an embodiment of the invention that other card advance mechanisms, card reading mechanisms or circuit arrangements may equally well be substituted for those illustrated and described herein.

Other mechanizations could also be used to allow the teacher to determine the number of problem answers attempted and correct answers by the student. For instance, a multiposition key operated mechanism could be used instead of the illustrated system which uses a single position key mechanism in combination with the keyboard. Of course the teaching machine could also be constructed to allow the teacher to interrogate the machine to determine the number of attempts and correct answers by the student without the use of a key or external implement. So, for example, the teaching machine could be provided to allow the teacher to determine the number of answer attempts and correct answers by merely pressing number keys of the keyboard simultaneously or in specific sequence.

Furthermore, it should also be noted that the counter could equally well count other quantities of interest to the teacher, for instance, the number of correct and incorrect answers entered by the student, these other quantities would, in any case, allow the simple determination of the number of problems attempted and the number of correct answers achieved.

At this point, it should be noted that the teaching machine described above has many features which make it suitable for its intended purpose of teaching relatively young students, in the lower grades, arithmetic, though, of course, its use is not restricted to this function only. However, the machine can be made of relatively small size, since much, if not all of the electronics, can be provided by means of miniaturized, solid-state circuitry, and there are relatively few mechanical moving parts. The machine, therefore, can easily be designed to be manipulated by relatively young children. Additionally, the machine can be battery-powered, to make it portable and, therefore, more convenient for use. The use of the record member with problems to be answered by the student appearing on both sides of the member adds efficiency to the use of the machine by cutting down the number of cards or record members which must be used in association with the teaching machine to progress through a designated teaching program.

Additionally, as shown in the drawings, the cards can be conveniently stored within the machine.

The teaching machine described above can be used by students not only for problems which are visually readable on the record member, but additionally, the machine can be used in conjunction with separately printed teaching programs coordinated to record members which in turn provide the machine readable answers to the question in the programs. So, for example, "programmed" teaching programs or multiple choice teaching programs can be developed in booklet form and coordinated with record members containing machine readable answers corresponding booklet. The student would then index the record member or card to a specific problem number, read the problem in the book and then enter his answer on the keyboard. The keyboard would then light up if the student's answer was correct. The teacher could then periodically check progress of the student or else wait until the entire teaching program was completed in order to check the score of the student.

One of the main advantages of the teaching machine described above is the ability for the student to work almost independently of the teacher, since the records of his progress are accurately stored by the machine and cannot be tampered with, and the teacher can very simply come to check the progress of the student by merely interrogating the machine to determine the number of attempts and correct answers that the student has produced.

It will be understood that various changes in the details, materials and arrangements of parts which have been herein described and illustrated in order to explain the nature of the invention may be made by those skilled in the art within the principle and scope of the invention, as expressed in the appended claims.

What is claimed is:

1. A record member for use in a teaching machine comprising: first and second opposing planar surfaces; a column of visibly readable statements of problems on said first planar surfaces; a column of perforated machine readable answers on said first planar surface corresponding to the problems on the column of visibly readable statements of problems; indexing means on said record member to enable incremental advancement of said record member; the machine readable answers in said column of answers being displaced from the corresponding visibly readable statement of a problem in said column of problems to impede visual decoding of the machine readable answer;

a column of visibly readable statements of problems on said second planar surface;

a column of machine readable answers on said second planar surface corresponding to the problems in the column of visibly readable statements on said second planar surface;

the machine readable answers on said second planar surface in said column of answers on said second planar surface being displaced from the corresponding visually readable statement of a problem in said column of problems on said second planar surface.

2. The record member according to claim 1 wherein said column of machine readable answers on said first planar side and second planar side are vertically aligned.

3. The record member according to claim 2 further comprising actuating surface means adapted to coact with switch means in a teaching machine upon proper insertion of said record member in the teaching machine.

* * * * *